United States Patent [19]

Johnson et al.

[11] Patent Number: 4,509,840
[45] Date of Patent: Apr. 9, 1985

[54] LENS DRIVE FOR AUTO FOCUS CAMERA

[75] Inventors: Bruce K. Johnson, Andover; George D. Whiteside, Lexington, both of Mass.

[73] Assignee: Polaroid Corporation, Cambridge, Mass.

[21] Appl. No.: 581,539

[22] Filed: Feb. 21, 1984

[51] Int. Cl.³ .............................................. G03B 7/08
[52] U.S. Cl. ................................. 354/400; 354/195.1
[58] Field of Search .................. 354/400, 402, 195.1

[56] References Cited

U.S. PATENT DOCUMENTS 4,167,316  9/1979  Johnson et al. .................... 354/197
4,192,587  3/1980  LaRocque et al. ................... 354/27
4,258,988  3/1981  Kitai et al. ........................ 354/400
4,355,872 10/1982  Kitai et al. ........................ 354/400
4,367,935  1/1983  Kuge et al. ........................ 354/400

Primary Examiner—Russell E. Adams
Attorney, Agent, or Firm—Edward S. Roman

[57] ABSTRACT

A lens drive mechanism for an auto focus camera transmits a substantially uniform driving force to rotate a lens mechanism at a uniform rate from a drive member interconnecting a pair of shutter blade elements regardless of variations in the output of the camera battery supply which operate to impart variations in the speed at which the shutter blade connecting member is driven.

7 Claims, 5 Drawing Figures

LENS DRIVE FOR AUTO FOCUS CAMERA

BACKGROUND OF THE INVENTION

1. Field of the Invention

This invention relates generally to a uniform speed lens drive arrangement for an auto focus camera and, more particularly, to a lens drive arrangement for an auto focus camera which operates at a uniform speed regardless of variations in the camera power supply.

2. Description of the Prior Art

Photographic camera apparatus embodying both shutter blade mechanisms of the scanning type as well as rotatable lens mechanisms which may be automatically focused in accordance with determined camera-to-subject range are well known in the art as described in U.S. Pat. No. 4,167,316, entitled "Sonar Controlled Lens Focus Apparatus", by Bruce K. Johnson et al., issued Sept. 11, 1979, in common assignment herewith and U.S. Pat. No. 4,192,587, entitled "Proportional Fill Flash", by Arthur G. LaRocque et al., issued Mar. 11, 1980, in common assignment herewith and both of which are now incorporated by reference herein. Scanning shutter blade mechanisms of the aforementioned type generally embody two shutter blade elements disposed in overlapping relationship for counter-reciprocating motion with respect to each other. The shutter blades are interconnected by a blade connecting member generally called a walking beam. The blade connecting member is rotatably mounted to drive the shutter blade elements to define a progressively increasing aperture size. As is shown in U.S. Pat. No. 4,167,316, supra, it is convenient to utilize the initial movement of the blade connecting member to also set the lens mechanism into rotation.

Since the rotating lens mechanism must be stopped at the appropriate focal position corresponding to a previously determined camera-to-subject distance, it is necessary that the rotational dynamics of the lens mechanism be as predictable as possible particularly for systems where the lens stopping command is provided without benefit of a positive feedback signal to positively identify the instantaneous focal position of the lens mechanism. Thus, although it may be convenient to utilize the blade connecting member to set the rotatable lens mechanism into rotation, it may not always be possible to drive the lens mechanism at a uniform rate since variations in the camera battery supply output may affect the speed at which the blade connecting member is driven. Thus, if the speed of the blade connecting member varies in concert with variations in the output of the camera battery supply, there will be imparted a corresponding variation to the rotational speed at which the lens mechanism is driven thereby making the rotational dynamics of the lens mechanism unpredictable. With such unpredictable rotational dynamics, it becomes difficult if not impossible to stop the lens mechanism at the appropriate focal position particularly for an open loop system where there is no feedback signal provided relative to the exact focal position of the lens mechanism.

Therefore, it is a primary object of this invention to provide a lens drive system for an auto focus camera wherein the lens is driven at a uniform rate regardless of variations in the output of the camera battery supply.

It is a further object of this invention to provide a lens drive mechanism wherein the lens mechanism is driven at a uniform rate by way of a shutter blade connecting member regardless of variations in the output of the camera battery supply which affect the rotational speed at which the shutter blade connecting member is driven.

Other objects of the invention will be in part obvious and will in part appear hereinafter. The invention accordingly comprises a mechanism and system possessing the construction, combination of elements and arrangement of parts which are exemplified in the following detailed disclosure.

SUMMARY OF THE INVENTION

An auto focus camera of the type powered by a source of electrical energy and including means for determining camera-to-subject distance range and for providing an output range signal corresponding to the determined camera-to-subject distance range also includes an objective lens arrangement. Means are provided for mounting at least part of the objective lens arrangement for displacement between a plurality of focal positions. The objective lens arrangement is adapted to focus an image of a subject located at a different distance from the camera within a given range of distances at the focal plane of the camera at each of its focal positions. Electrically energizeable drive means are powered by the source of electrical energy to provide a driving movement by way of a drive member operatively associated therewith. Resilient drive means impart a substantially uniform driving movement directly to the lens mounting means in order to displace the lens mounting means between its plurality of focal positions in response to the driving movement of the drive member regardless of variations in the output of the source of electrical energy which would cause the drive member to provide a nonuniform drive movement. Means are also provided for stopping the lens mounting means at the appropriate focal position in response to the range signal.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

DESCRIPTION OF THE PREFERRED EMBODIMENT

Figure 1:
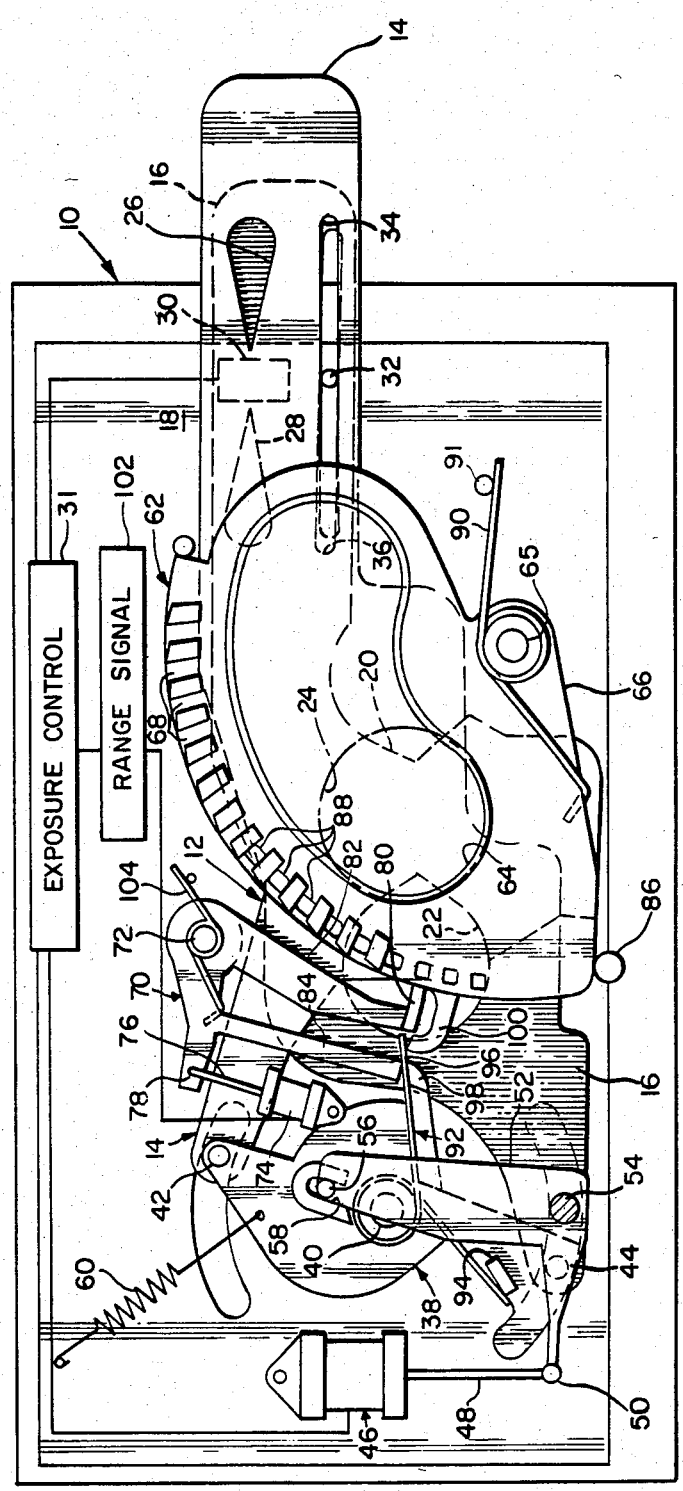
FIG. 1 is a front view of the exposure control system of this invention.

Referring now to FIG. 1, there is shown at 10 a photographic exposure control system embodying the lens drive arrangement of this invention comprising a scanning type shutter blade mechanism 12 having two overlapping shutter blade elements 14 and 16 disposed for reciprocal sliding movement with respect to each other on a baseblock casting 18. The shutter blade elements 14 and 16 are provided, respectively, with a portion of a scene light admitting primary aperture 20 and an entire scene light admitting primary aperture 22 to collectively define a progressive variation of effective aperture openings in accordance with simultaneous longitudinal and lateral displacement of one blade element with respect to the other blade element in a manner as is fully described in U.S. Pat. No. 3,942,183, entitled "Camera with Pivoting Blades", by George D. Whiteside, issued Mar. 2, 1976, in common assignment herewith and now incorporated by reference herein. Although as is readily apparent only a portion of the scene light admitting aperture 20 is actually cut into the blade 14, it will hereinafter be referred to simply as primary aperture 20. The primary apertures 20 and 22 are selectively shaped so as to overlap a light entry exposure opening 24 in the baseblock casting 18 thereby defining a varying effective aperture size as a function of the position of the blade elements 14 and 16.

Each of the blades 14 and 16 may additionally be configured to have corresponding photocell sweep secondary apertures shown, respectively, at 26 and 28. Secondary apertures 26 and 28 may be configured in correspondence with the shapes of scene light admitting primary apertures 20 and 22. As is readily apparent, the secondary apertures 26 and 28 also move in correspondence with the primary apertures 20 and 22 to define a small secondary aperture for admitting the passage of scene light from the scene being photographed to a scene light detecting station as shown generally at 30. The scene light detecting station 30 includes a photoresponsive element (not shown) which provides a signal to a light integrating circuit in an exposure control circuit as shown generally at 31 which operates in a manner as is fully described in U.S. Pat. No. 4,192,587, supra. Thus, the exposure interval can be terminated as a function of the amount of light received through the secondary effective aperture defined by the overlapping photocell sweep apertures 26 and 28 in a manner as is fully described in U.S. Pat. No. 4,192,587, supra.

Projecting from the baseblock casting 18 at a location spaced laterally apart from the light entry exposure opening 24 is a pivot pin or stud 32 which pivotally and translatably engages elongate slots 34 and 36 formed in respective shutter blade elements 14 and 16. Pin 32 may be integrally formed with the baseblock casting 18, and blade elements 14 and 16 may be retained in engaging relation with respect to the pin 32 by a suitable means.

The opposite ends of the blade elements 14 and 16 respectively include extended portions which pivotally connect to a walking beam 38. The walking beam 38, in turn, is disposed for rotation relative to the baseblock casting 18 by pivotal connection to a projecting pivot pin or stud 40 which may also be integrally formed with the baseblock casting 18 at a location spaced laterally apart from the light entry exposure opening 24. The walking beam 38 may be pivotally retained with respect to the pin 40 by conventional means such as an E ring (not shown). In the preferred mode, the walking beam 38 is pivotally connected at its distal ends to the shutter blade elements 14 and 16 by respective pin members 42 and 44 which extend laterally outward from the walking beam 38.

Drive means are provided for displacing the blade mechanism and include a tractive electromagnetic device in the form of a solenoid 46 employed to displace the shutter blades 14 and 16 with respect to each other and the baseblock casting 18. The solenoid 46 includes an internally disposed cylindrical plunger 48 which retracts inwardly into the body of the solenoid upon energization of the solenoid winding. The outside end of the solenoid plunger 48 pivotally connects at 50 to a drive bell crank 52 which, in turn, is pivotally connected at 54 to a wall member (not shown) forward of the baseblock casting 18. The other side of the bell crank 52, in turn, includes an integral drive pin 56 extending laterally outward from the side thereof for sliding engagement in a slot or groove 58 integrally molded with respect to the walking beam 38. In this manner, the solenoid plunger 48 is connected to the walking beam 38 by way of the bell crank 52 so that vertical displacement of the plunger 48 will operate to rotate the walking beam 38 around the pivot pin 40 so as to appropriately displace the shutter blades 14 and 16.

Figure 5:
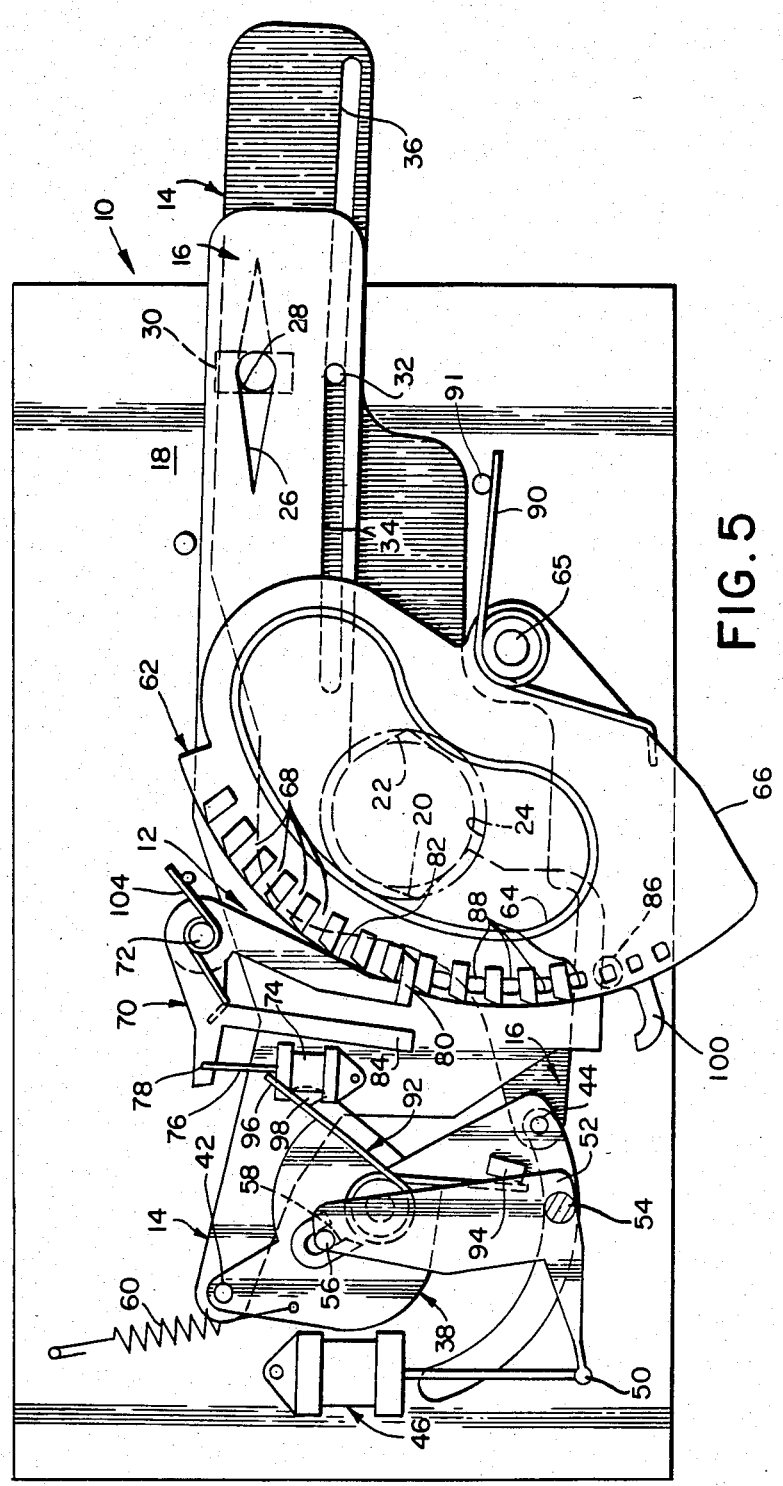
FIG. 5 is a front view of the exposure control system of FIG. 1 showing some components thereof in still another operative position.

This drive means may additionally include a tension spring 60 connected between the baseblock casting 18 and the walking beam 38 so as to continuously urge the walking beam 38 to rotate in a counterclockwise direction as viewed in FIG. 1 thereby also continuously urging the blade elements 14 and 16 into positions defining their largest effective aperture opening over the light entry exposure opening 24 as best seen in FIG. 5. As will be readily understood, in some shutter blade arrangements it may be preferable to utilize a compression spring in place of the tension spring 60 in a manner as is shown in U.S. Pat. No. 4,167,316, entitled "Sonar Controlled Lens Focus Apparatus", by Bruce K. Johnson et al., issued Sept. 11, 1979, in common assignment herewith and now incorporated by reference herein.

An objective lens assembly as shown generally at 62 preferably comprises a variable focus lens element 64 disposed within a holding member 66 for rotation about a pivot pin 65 fixedly connected with respect to the baseblock casting 18. As will be readily understood, the objective lens assembly 62 may comprise other lens elements (not shown) in fixed optical alignment with respect to the light entry exposure opening 24 and the variable focus lens element 64. The lens holding member 66 thus may be rotated between a plurality of focal positions wherein the objective lens assembly 62 is adapted to focus an image of a subject located at a different distance from the camera within a given range of distances at the focal plane (not shown) of the camera for each of its focal positions. The variable focus lens element 64 herein described is the invention of another and the subject of copending patent application Ser. No. 566,311, entitled "Analytic Function Optical Component", by J. Baker et al., filed Dec. 28, 1983 in common assignment herewith. As will be readily apparent, it may be replaced by a plurality of spaced apart discrete lens elements in a manner as is fully described in U.S. Pat. No. 4,167,316, supra. The lens holding member 66 includes a plurality of spaced apart integral slots or grooves 68 disposed about the periphery thereof which correspond to the number of different focal positions to which the lens assembly 62 may be set as will become apparent from the following discussion.

A latch pawl as shown generally at 70 is disposed for rotation with respect to the baseblock casting 18 by a pivot pin 72. Drive means are provided for displacing the latch pawl 70 and include another tractive electromagnetic device in the form of another solenoid 74 which also includes an internally disposed cylindrical plunger 76 which retracts inwardly into the body of the solenoid upon energization of the solenoid winding. The outer end of the plunger 46 pivotally connects at 78 to the latch pawl 70. The latch pawl 70 comprises a first integral elongated finger 82 extending outwardly from the pivot 72 to an integral latch tang 80 which may be slidably engaged within the grooves 68 in the manner of this invention to be subsequently described. The latch pawl 70 further comprises a resilient elongated integral second finger 84 which extends outwardly from the pivot 72 in generally parallel relationship with respect to the first finger 82 for engagement with the walking beam 38 also in the manner of this invention to be subsequently described herein.

A photocell and IRED as shown generally at 86 are spaced apart on opposite sides of the lens holding member 66 in optical registration with respect to each other along an axis normal to the plane of the drawing. The lens holding member 66 also includes a plurality of spaced apart apertures 88 disposed about the periphery thereof inside respective slots or grooves 68. Thus, counterclockwise rotation of the lens holding member 66 as viewed in FIG. 1 operates to drive the apertures 88 between the photocell and IRED 86 so as to enable the photocell to provide an output pulse count to the exposure control 31 indicative of the lens holding member 66 position. The lens holding member 66 is also resiliently biased to rotate in a clockwise direction as viewed from FIG. 1 by a biasing leaf spring 90 disposed about the pivot pin 65 with one end thereof resiliently engaged against a stop pin 91 from the baseblock casting 18.

Drive means are provided in accordance with this invention for rotating the lens holding member 66 in a counterclockwise direction against the resilient bias of the torsion spring 90 by a lens drive torsion spring 92, one end of which engages an integral stop member 94 from the walking beam 38 and the other end of which engages another integral stop member 98 from the walking beam 38 so as to establish a minimum pretension of the spring 92. The torsion spring 92 is coaxially disposed with respect to the walking beam 38. The outer end of the lens drive torsion spring 92 as shown at 96 is cantilevered beyond the stop 98 and operates to drive the lens holding member 66 by engaging an integral drive arm 100 extending radially outward from the lens holding member 66.

Operation of the above-described exposure control system may commence in the usual manner upon the depression of an exposure cycle initiation button (not shown) as is fully described in U.S. Pat. No. 4,192,587, supra. The exposure control system 10 preferably comprises an automatic ranging system which provides a range signal corresponding to the camera-to-subject distance range. The automatic ranging system may be of the sonic type as is fully described in U.S. Pat. No. 4,192,587, supra, and thereby provide the range signal to a range signal circuit as shown generally at 102.

Figure 2:
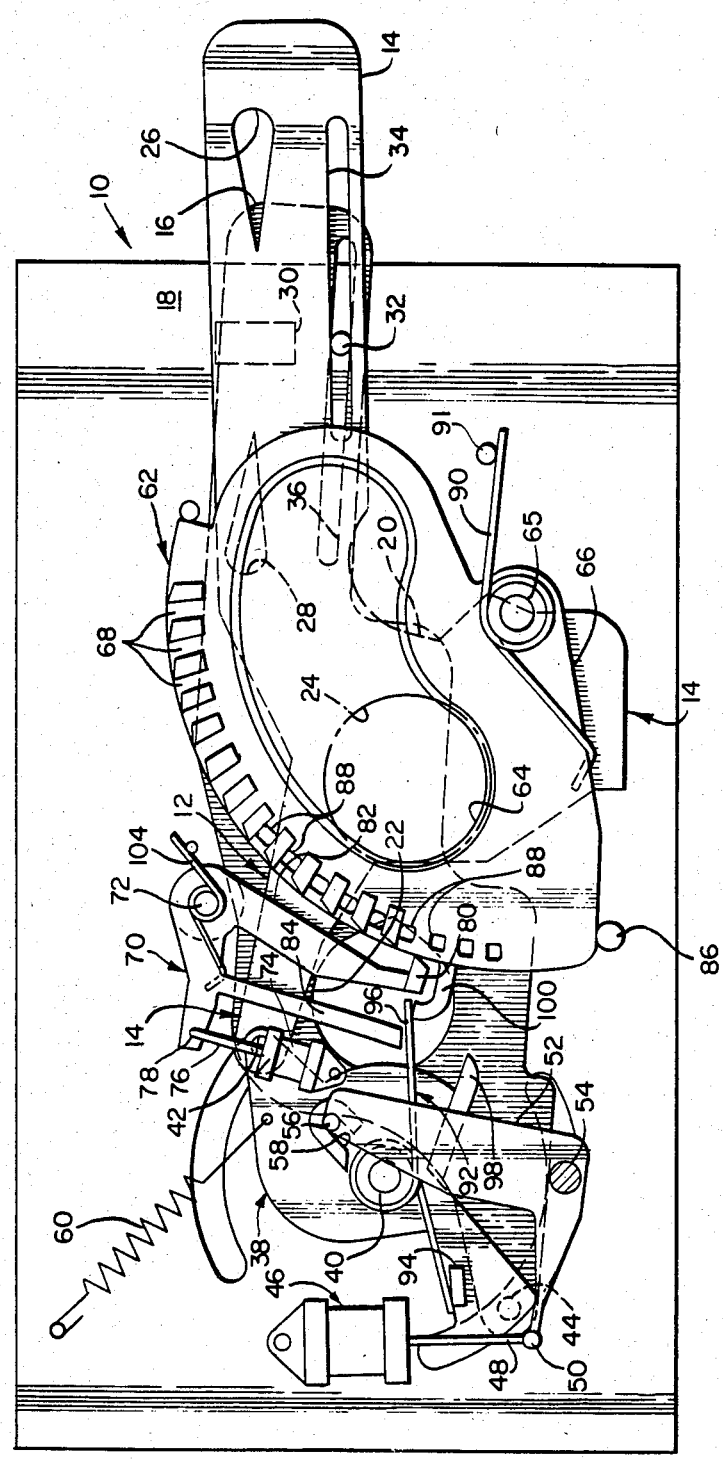
FIG. 2 is a front view of the exposure control system of FIG. 1 showing some components thereof in another operative position.
Figure 3:
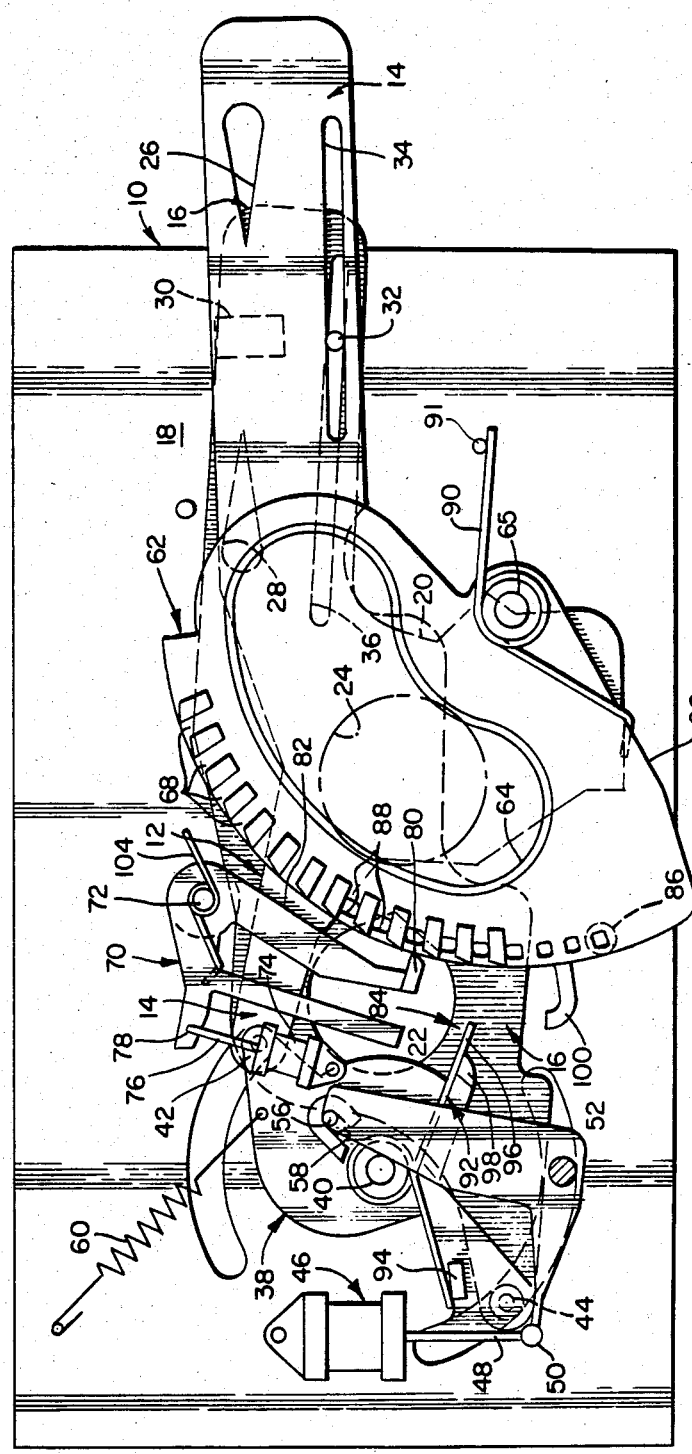
FIG. 3 is a front view of the exposure control system of FIG. 1 showing some components thereof in still another operative position.

After the operation of the automatic rangefinder and the provision of the range signal corresponding to the determined camera-to-subject distance range in the aforementioned manner, solenoid 46 is energized so as to retract the plunger 48 thereof inwardly into the solenoid winding and thereby rotate the bell crank 52 in a clockwise direction so as to simultaneously rotate the walking beam clockwise about its pivot 40 from its position as shown in FIG. 1 to its position as shown in FIG. 2. This limited rotation of the walking beam 38 operates initially to further tension the lens drive spring 92 from its initial pretensioned condition, and the spring constant is selected to be low so that the lens driving end 96 of the spring 92 does not respond quickly enough to keep up with the stop member 98 and hence does not initially impart any substantial rotational driving movement to the lens holding member 66. After the walking beam 38 is driven to its position as shown in FIG. 2, the lens drive spring 92 unwinds so as to rotate the drive end 96 thereof in a clockwise direction from its position as shown in FIG. 2 to its position as shown in FIG. 3 thereby also simultaneously engaging the drive arm 100 so as to set the lens holding member 66 into counterclockwise rotation against the resilient bias of its return spring 90. Thus, the untensioning of the drive spring 92 operates to drive the lens holding member 66 and its associated variable focus lens element 64 through its plurality of focal positions in the manner of this invention.

Variations in the power or voltage output of the camera battery (not shown) can effect the energization of the solenoid 46 and hence the speed at which the plunger 48 is retracted inwardly thereof. This, in turn, effects the rotational speed at which the walking beam 38 is driven. These variations in the rotational speed of the walking beam 38, however, do not effect the speed at which the lens holding member 66 is driven, since the rate at which the drive spring 92 untensions against the lens holding member 66 remains substantially uniform regardless of the speed of the walking beam 38. Thus, the lens holding member 66 is driven at a uniform speed in the manner of this invention regardless of variations in the camera battery output.

When the output pulse count from the photocell-IRED 86 indicates that the lens element 64 has reached a focal position corresponding to the determined camera-to-subject distance as represented by the range signal, the circuit 102 operates to energize the solenoid 74 so as to retract the plunger 76 inwardly into the winding thereof. This, in turn, operates to rotate the latch pawl 70 in a counterclockwise direction about the pivot pin 72 so as to drive the latch tang 80 into the appropriate groove 68 and stop the rotation of the lens holding member 66 at the appropriate focal position corresponding to the previously determined camera-to-subject distance range. Although the aforementioned system is of the closed loop type wherein a feedback signal positively identifies the instantaneous focal position of the lens holding member 66, it will be readily understood that the lens drive arrangement of the invention could also be advantageously utilized with open loop systems of the type described in U.S. Pat. Nos. 4,167,316 and 4,192,587, supra.

Figure 4:
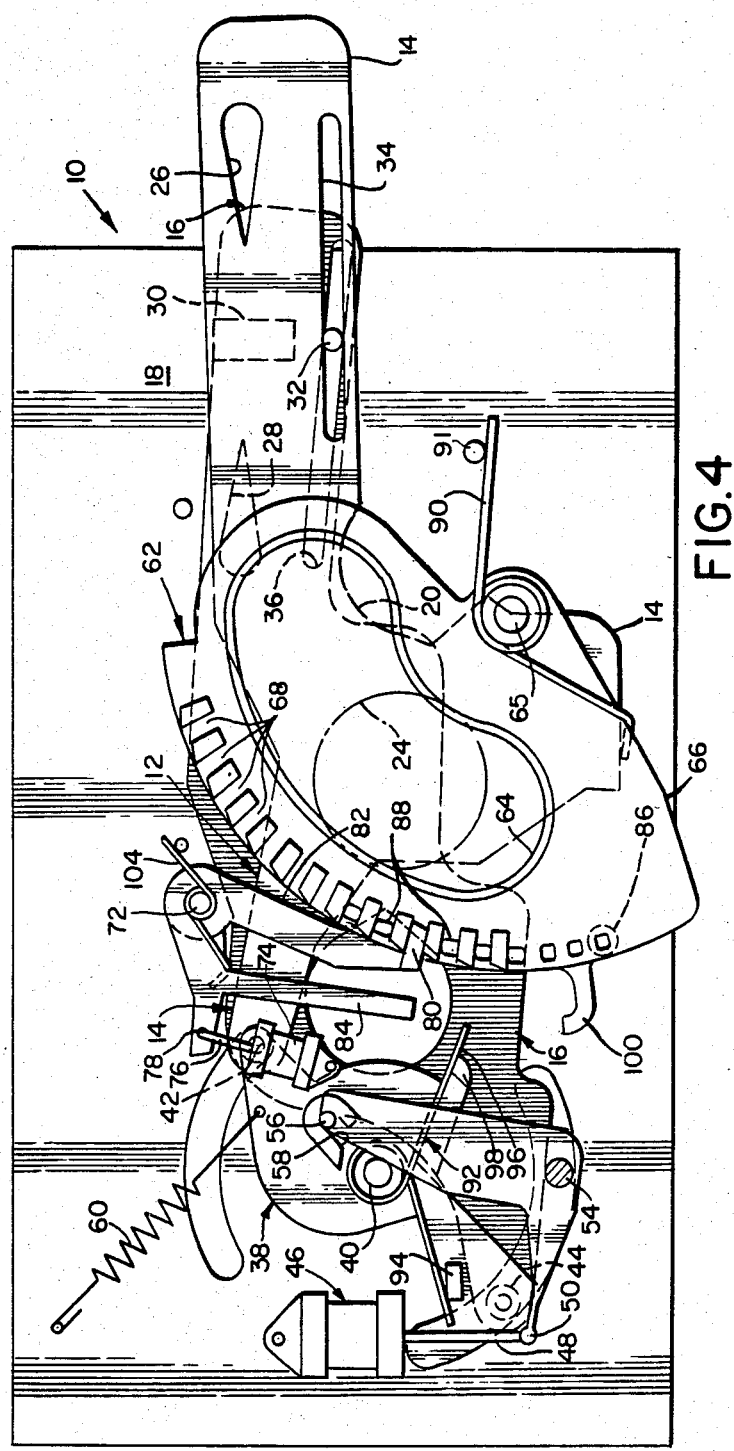
FIG. 4 is a front view of the exposure control system of FIG. 1 showing some components thereof in still another operative position.

After the latch pawl 70 has been rotated into its lens latching position as shown in FIG. 4 in the aforementioned manner, the solenoid 46 is deenergized so as to allow the walking beam 38 to be rotated in a counterclockwise direction under the driving influence of tension spring 60 thereby driving the shutter blade elements 14 and 16 from their scene light blocking arrangement as shown in FIG. 4 toward their maximum aperture size defining position as shown at FIG. 5.

Upon the determination of the correct exposure by the scene light detecting station 30 and exposure control circuit 31 in a manner as is fully described in U.S. Pat. No. 4,192,587, supra, there is applied a control signal operative to energize the solenoid 46 and withdraw the plunger 48 therein so as to rotate the walking beam 38 in a clockwise direction from its scene light admitting position as shown in FIG. 5 back to its scene light blocking position as shown in FIG. 4. Upon the termination of the exposure cycle and the rotation of the walking beam 38 back to its scene light blocking position as shown in FIG. 4, there is provided a control signal operative to deenergize the solenoid 74 thereby allowing the latch pawl 70 to be rotated in a clockwise direction about its pivot pin 72 under the urging influence of a drive leaf spring 104 back to its original position as shown in FIG. 3. The lens holding member 66 is thereafter rotated back to its original position as shown in FIG. 2 under the driving influence of its return spring 90. A control signal is thereafter provided to deenergize the solenoid 46 so as to allow limited rotation of the walking beam 38 in a counterclockwise direction under the biasing influence of its drive spring 60 so as to drive the stop member 98 into engagement with the end of the elongated second finger 84 of the latch pawl 70. In this manner, the walking beam 38 is latched to a position as shown in FIG. 1 so as to be maintained in its scene light blocking arrangement indefinitely without continued energization of either solenoid 46 or 74.

In this manner there is provided a lens drive system for an auto focus camera wherein the lens is driven at a substantially uniform rate regardless of variations in the output of the camera battery supply. Other embodiments of the invention including additions, subtractions, deletions, and other modifications of the preferred disclosed embodiments of the invention will be obvious to those skilled in the art and are within the scope of the following claims.

What is claimed is:

1. An auto focus camera of the type powered by a source of electrical energy and including means for determining camera-to-subject distance range and for providing an output range signal corresponding to said determined camera-to-subject distance, said camera also comprising:

an objective lens arrangement;

means for mounting at least part of said objective lens arrangement for displacement between a plurality of focal positions, said objective lens arrangement being adapted to focus an image of a subject located at a different distance from said camera within a given range of distances at the focal plane of said camera at each of its said focal positions;

energizeable drive means powered by the source of electrical energy for providing a driving movement by way of a drive member operatively associated therewith;

resilient drive means for imparting a substantially uniform driving movement directly to said lens mounting means in order to displace said lens mounting means between said plurality of focal positions in response to said driving movement of said drive member regardless of variations in the output of the source of electrical energy which would cause said drive member to provide a nonuniform drive movement; and means for stopping said lens mounting means at the appropriate focal position in response to said range signal.

2. The camera of claim 1 wherein said driving movement provided by said drive member and said displacement of said lens mounting means are both rotational and said resilient drive means comprises a torsion spring having a low spring constant so that said torsion spring is tensioned initially by the rotational movement of said energizeable drive means without imparting any rotational driving movement to said lens mounting means, said torsion spring thereafter unwinding against said lens holding member so as to impart a substantially uniform rotational movement thereto.

3. The camera of claim 2 wherein said torsion spring is coaxially disposed with respect to said drive member and includes one end thereof cantilevered outward of said drive member for engagement against said lens holding member wherein the opposite end of said torsion spring from said cantilevered end is moved to tension said torsion spring when said drive member is first rotated and the cantilevered end of said torsion spring thereafter moves against said lens holding member when said torsion spring thereafter unwinds.

4. The camera of claim 3 wherein said torsion spring is carried on said drive member by two stop members which engage opposite ends of said torsion spring so as to maintain a minimum tension of said torsion spring, one of said stop members operating against said opposite end of said torsion spring from said cantilevered end to further tension said torsion spring when said drive member is rotated, said cantilevered end of said torsion spring thereafter moving toward said other of said stop members when said torsion spring unwinds.

5. The camera of claim 2 wherein said camera further comprises a shutter blade mechanism and said drive member of energizeable drive means comprises a shutter blade connecting member disposed for rotation in one direction from a first position in which said blade mechanism defines a scene light blocking arrangement to a second position in which said blade mechanism defines a maximum size aperture, rotation of said blade connecting member from its said first position in the opposite direction to said one direction of rotation operating to effect said initial tensioning of said torsion spring.

6. The camera of claim 5 wherein said torsion spring is coaxially disposed with respect to said shutter blade connecting member and includes one end thereof cantilevered outward of said shutter blade connecting member for engagement against said lens holding member, wherein the opposite end of said torsion spring from said cantilevered end is moved when said blade connecting means moves from its said first position in the opposite direction to said one direction of rotation to initially tension said torsion spring and the cantilevered end of said torsion spring thereafter moves against said lens holding member when said torsion spring thereafter unwinds.

7. The camera of claim 6 wherein said torsion spring is carried on said shutter blade connecting member by two stop members which engage opposite ends of said torsion spring so as to maintain a minimum tension on said torsion spring, one of said stop members operating against said opposite end of said torsion spring from said cantilevered end to further tension said torsion spring when said blade connecting means moves from its said first position in the opposite direction to said one direction of rotation, said cantilevered end of said torsion spring thereafter moving toward said other of said stop members when said torsion spring unwinds.

* * * * *